US009838374B2

(12) United States Patent
Neverov

(10) Patent No.: US 9,838,374 B2
(45) Date of Patent: Dec. 5, 2017

(54) METHOD AND COMPUTER-BASED SYSTEM FOR ANONYMOUSLY AUTHENTICATING A SERVICE USER

(71) Applicant: YANDEX EUROPE AG, Lucerne (CH)

(72) Inventor: Vladimir Mikhailovich Neverov, Moscow Region (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/504,179

(22) PCT Filed: Mar. 17, 2015

(86) PCT No.: PCT/IB2015/051949
§ 371 (c)(1),
(2) Date: Feb. 15, 2017

(87) PCT Pub. No.: WO2016/083900
PCT Pub. Date: Jun. 2, 2016

(65) Prior Publication Data
US 2017/0244690 A1 Aug. 24, 2017

(30) Foreign Application Priority Data

Nov. 28, 2014 (RU) ................. 2014147905

(51) Int. Cl.
*G06F 7/04* (2006.01)
*H04L 29/06* (2006.01)
*G06F 21/62* (2013.01)

(52) U.S. Cl.
CPC .......... *H04L 63/08* (2013.01); *G06F 21/6263* (2013.01)

(58) Field of Classification Search
CPC ............. H04L 63/0421; H04L 63/0428; H04L 63/0807; G06F 21/31; G06F 21/41; G06F 21/45; G06F 21/64
(Continued)

(56) References Cited

U.S. PATENT DOCUMENTS 8,474,017 B2 * 6/2013 Schultz .................. G06F 21/41
726/4
8,490,168 B1 * 7/2013 Holloway ........... H04L 63/0815
709/229
(Continued)

FOREIGN PATENT DOCUMENTS

EA  012094 B1  8/2009
RU  2308755 C2  10/2007
(Continued)

OTHER PUBLICATIONS

International Search Report from PCT/IB2015/051949, Copenheaver, Blaine, dated Jul. 9, 2015.
(Continued)

*Primary Examiner* — Samson Lemma
(74) *Attorney, Agent, or Firm* — BCF LLP

(57) ABSTRACT

A computer-implemented method of and a first web service system for anonymously authenticating a service user having an account associated with a first web service system are disclosed. The method is executable by a processor and comprises receiving an authentication request originating from a device of the service user, the authentication request comprising data identifying the account of the service user; generating, based on data relating to the account of the service user, a token comprising first data anonymously authenticating the service user and second data identifying an action that a second web service system is authorized to perform for the service user; storing, in a memory, at least one of the first and second data of the token; and transmitting
(Continued)

the generated token to the second web service system. A computer-implemented method executable by a second web service system and a second web service system are also disclosed.

20 Claims, 6 Drawing Sheets

(58) Field of Classification Search
USPC .......................................................... 726/28
See application file for complete search history.

(56) References Cited

U.S. PATENT DOCUMENTS

| | | | |
|---|---|---|---|
| 8,504,910 B2 | 8/2013 | Tarjan | |
| 8,763,153 B2 | 6/2014 | Park et al. | |
| 9,674,180 B2 * | 6/2017 | Maes | ................ H04L 29/12047 |
| 2012/0023556 A1 | 1/2012 | Schultz et al. | |
| 2014/0059693 A1 * | 2/2014 | Stecher | ............... H04L 63/0421 |
| | | | 726/26 |
| 2014/0075531 A1 | 3/2014 | Maes | |
| 2014/0101736 A1 | 4/2014 | Mays et al. | |

FOREIGN PATENT DOCUMENTS

| | | |
|---|---|---|
| RU | 2440688 C2 | 1/2012 |
| WO | 2013158861 A1 | 10/2013 |

OTHER PUBLICATIONS

International Preliminary Report on Patentability from PCT/IB2015/051949, Chang, Jungwon, dated Jan. 11, 2016.
English abstract of EA012094 retrieved from Espacenet on Jan. 18, 2016.
Henry, Facebook Is Tracking Your Every Move on the Web; Here's How to Stop It, http://lifehacker.com/5843969/facebook-is-tracking-your-every-move-on-the-web-heres-how-to-stop-it, Sep. 26, 2011, retrieved on Feb. 14, 2017.

* cited by examiner

METHOD AND COMPUTER-BASED SYSTEM FOR ANONYMOUSLY AUTHENTICATING A SERVICE USER

CROSS-REFERENCE

The present application claims priority to Russian Patent Application No. 2014147905, filed Nov. 28, 2014, entitled "METHOD AND COMPUTER-BASED SYSTEM FOR ANONYMOUSLY AUTHENTICATING A SERVICE USER" the entirety of which is incorporated herein.

FIELD

The present technology relates to computer-based systems and methods for anonymously authenticating a service user having an account associated with a web service system.

BACKGROUND

Recent developments in the field of web service systems, in particular social network service systems such as Facebook™, allow a base web service system to interact with an external web service system, external to the base web service system. Such external web service systems may also be referred to as side web service systems. Mechanisms allowing a base web service system to interact with a side web service system have been developed and include, for example, allowing a user to log into the side web service system by providing her/his login associated with the base web service system. In such example, once the user is logged into the side web service system, a communication channel is established between the side web service system and the base web service system. The communication channel allows the side web service system to access data associated with an account of the user located in the base web service system. U.S. Pat. No. 8,504,910 provides details about implementation of such communication channel. In particular, U.S. Pat. No. 8,504,910 recites that an Application Programming Interface (API) request server allows one or more external websites to access information from the social networking system by calling one or more APIs. For example, responsive to an API request, the API request server collects data associated with a user and communicates the collected data to the external website.

Even though the existing mechanisms allowing a base web service system to interact with a side web service system (such as the mechanism detailed in U.S. Pat. No. 8,504,910) enhance a user experience by facilitating interactions between a base web service system and a side web service system, a need remains for improvements, in particular improvements aiming at better controlling access to data associated with an account of a user of a base web service system, such data being located in a memory of the base web service system.

SUMMARY

In some applications, it is desirable to limit or avoid providing data associated with an account of a user of a base web service system to a side web service system. For example, a service user may seek to better control sharing of data relating to personal information associated with her/his account on the base web service system, such data being stored in a memory of the base web service system. The problem of better controlling the sharing of data relating to personal information might be prevalent in contexts where the base web service system interacts with one or more side web service systems which the user might not know and/or trust as much as the base web service system.

The present technology arises from an observation made by the inventor(s) that a token, generated by the base web service system to anonymously identify a service user, might be used by a side web service system to authorize an action associated with the service user to be performed by the side web service system. Once the action is performed by the side web service system, data associated with the performing of the action may then be received by the base web service system and associated with the user account on the base web service system. The present technology therefore allows a service user of the base web service system to perform an action on a side web service system while precluding the side web service system to access data relating to personal information of the service user stored in a memory of the base web service system.

Thus, in one aspect, various implementations of the present technology provide a computer-implemented method of anonymously authenticating a service user having an account associated with a first web service system, the method executable by a processor of a second web service system, the second web service system being different from the first web service system, the method comprising:

receiving a token generated by the first web service system in response to an authentication request originating from an electronic device of the service user, the token comprising first data anonymously authenticating the service user and second data identifying an action that the second web service system is authorized to perform for the service user;

storing, in a non-transitory computer-readable medium of the second web service system, the first and second data of the token;

accessing at least one of the first and second data of the token in response to an attempt of the second web service system to perform an action associated with the service user; and determining, based on the at least one of the first and second data of the token, whether the second web service system is authorized to perform the action for the service user.

In some implementations, upon determining that the second web service system is authorized to perform the action for the service user, the method further comprises generating data associated with the action performed by the second web service system.

In some further implementations, the method further comprises transmitting, to one of the first web service system and the electronic device, the data associated with the action performed by the second web service system.

In some implementations of any one of the above-recited aspects, the determining whether the second web service system is authorized to perform the action for the service user comprises granting an authorization to perform the action by the second web service system if the action which the second web service system is attempting to perform corresponds to the action identified by the second data of the token.

In some further implementations of any one of the above-recited aspects, the determining whether the second web service system is authorized to perform the action for the service user comprises declining an authorization to perform the action by the second web service system if the action which the second web service system is attempting to perform does not correspond to the action identified by the second data of the token.

In some implementations of any one of the above-recited aspects, upon determining that the second web service system is not authorized to perform the action for the service user, the method further comprises:

transmitting, from the second web service system to the first web service system, an indication that the action for the service user is not authorized.

In some further implementations of any one of the above-recited aspects, receiving the token generated by the first web service system in response to an authentication request originating from an electronic device of the service user is executed after:

receiving, on the second web service system, the authentication request from the electronic device of the service user, the authentication request comprising data identifying the account of the service user associated with the first web service system; and transmitting, from the second web service system, the authentication request to the first web service system.

In another aspect, various implementations of the present technology provide a computer-implemented method of anonymously authenticating a service user having an account associated with a first web service system, the method executable by a processor of the first web service system, the method comprising:

receiving an authentication request originating from an electronic device of the service user, the authentication request comprising data identifying the account of the service user associated with the first web service system;

generating, based on data relating to the account of the service user associated with the first web service system, a token comprising first data anonymously authenticating the service user and second data identifying an action that a second web service system is authorized to perform for the service user, the second web service system being different from the first web service system;

storing, in a non-transitory computer-readable medium of the first web service system, at least one of the first and second data of the token; and transmitting the generated token to the second web service system.

In some implementations, the method further comprises further receiving, from the second web service system, data associated with an action performed by the second web service system for the service user, the action performed by the second web service corresponding to the action identified by the second data of the token.

In some further implementations, the data associated with the action performed by the second web service is generated further to a determination made by the second web service system, based on the second data of the token, that the second web service system is authorized to perform the action for the service user.

In some implementations, the second data of the token are being generated, at least partially, based on a list of actions that the second web service system is authorized to perform for the service user.

In some further implementations, receiving the authentication request originating from the electronic device of the service user is executed after:

prompting the service user to establish the list of actions that the second web service is authorized to perform.

In some implementations, receiving the authentication request originating from the electronic device of the service user is executed before:

determining whether the authentication request corresponds to data associated with the account of the service user associated with the first web service system.

In some further implementations, the method further comprises:

associating the data associated with the action performed by the second web service system with the account of the service user associated with the first web service system; and storing, in the non-transitory computer-readable medium of the first web service system, the data associated with the action performed by the second web service system.

In some implementations, the method further comprises:

identifying the first data of the token associated with the data associated with the action performed by the second web service system;

reading, from the non-transitory computer-readable medium of the first web service system, the second data of the token corresponding to the first data of the token identified as being associated with the data associated with the action performed by the second web service system; and determining whether the action performed by the second web service system corresponds to the action identified in the second data of the token read from the non-transitory computer-readable of the first web service system.

In some further implementations, the method further comprises, upon determination that the action performed by the second web service system corresponds to the action identified in the second data of the token read from the non-transitory computer-readable of the first web service system:

associating the data associated with the action performed by the second web service system with the account of the service user associated with the first web service system; and storing, in the non-transitory computer-readable medium of the first web service system, the data associated with the action performed by the second web service system.

In some implementations of any one of the above-recited aspects, the method further comprises receiving from the second web service system, an indication that the action for the service user is not authorized, the indication being generated by the second web service system upon determining that the second web service system is not authorized to perform the action for the service user.

In some further implementations of any one of the above-recited aspects, the token is formed as a first data package and a second data package, the first data package comprises the first data of the token and the second data package comprises the second data of the token, the first and second data packages being generated and transmitted independently from one another.

In some implementations of any one of the above-recited aspects, the first web service system has a different domain name than the second web service system.

In some further implementations of any one of the above-recited aspects, the first web service system is one of a social network service system, an email service system, an account management service system, an information keeping service, a blog web service system and an e-commerce service system; and wherein the second web service system is one of a social network service system, an email service system, an account management service system, an information keeping service, a blog web service system and an e-commerce service system.

In some implementations of any one of the above-recited aspects, the data associated with the action performed by the second web service system relates to a transaction conducted between the service user and the second web service system.

In other aspects, various implementations of the present technology provide a non-transitory computer-readable medium storing program instructions for anonymously authenticating a service user having an account associated with a first web service system, the program instructions being executable by a processor of a computer-based system to carry out one or more of the above-recited methods.

In other aspects, various implementations of the present technology provide a computer-based system comprising at least one processor and a memory storing program instructions for anonymously authenticating a service user having an account associated with a first web service system, the program instructions being executable by one or more processors of a computer-based system to carry out one or more of the above-recited methods.

In the context of the present specification, unless expressly provided otherwise, an "electronic device", a "computer-based system" and "a web service system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
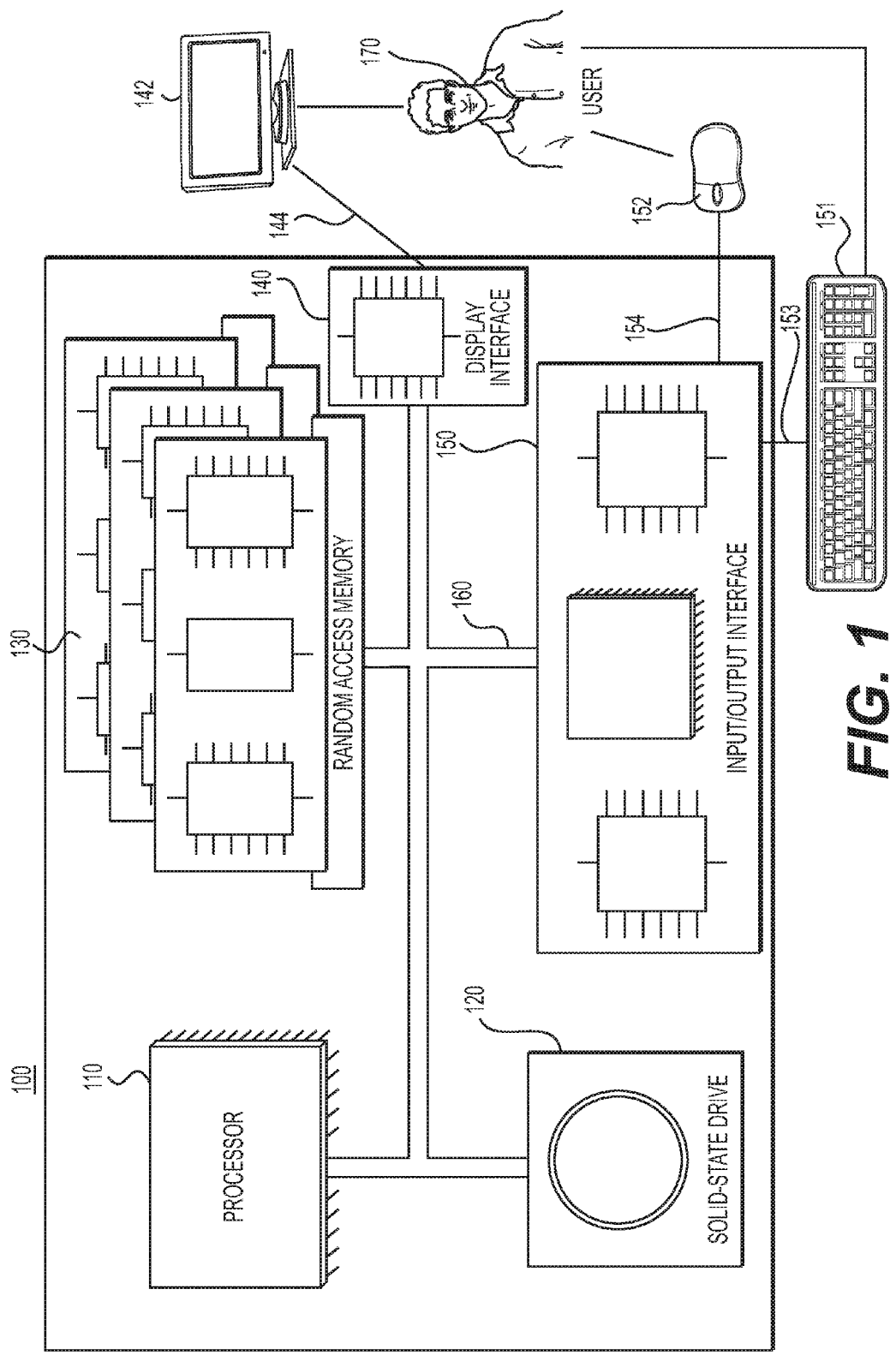
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a service user 170 (also referred to as a service user), and the input/output interface 150 may be coupled to a keyboard 151 (e.g. via a USB cable 153) and a mouse 152 (e.g. via a USB cable 154), each of the keyboard 151 and the mouse 152 being operable by the service user 170.

According to implementations of the present technology, the solid-state drive 120 stores program instructions suitable for being loaded into the random access memory 130 and executed by the processor 110 for anonymously identifying a service user having an account associated with a first web service system. For example, the program instructions may be part of a library or an application.

Figure 2:
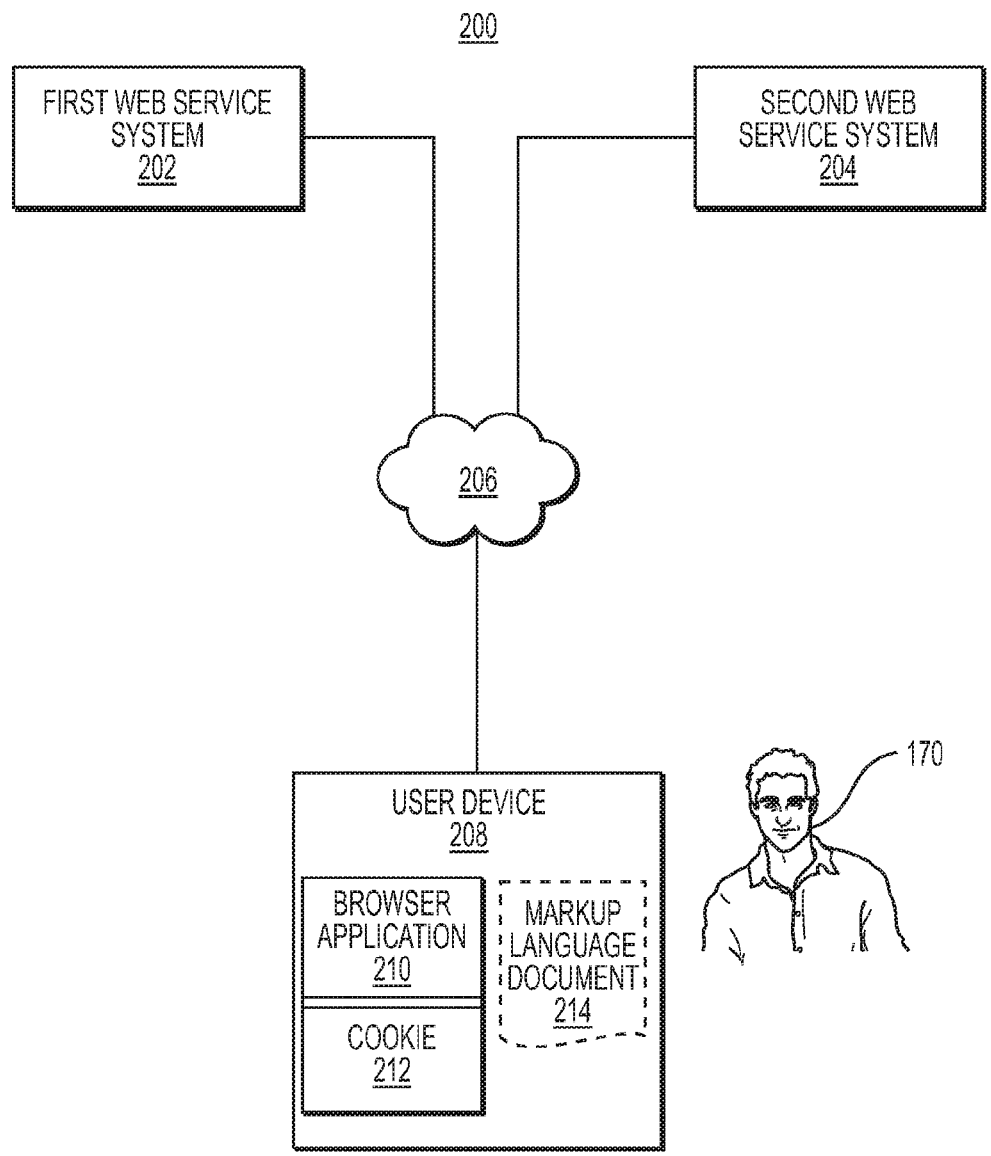
FIG. 2 is a diagram of a networked computing environment suitable for use with some implementations of the present technology.

In FIG. 2, there is shown a networked computing environment 200 suitable for use with some implementations of the present technology, the networked computing environment 200 comprising a first web service system 202, a second web service system 204, a user device 208 as well as a network 206 enabling these systems to communicate.

The first web service system 202 and the second web service system 204 may be systems providing web services to one or more service users 170 interacting with the first web service system 202 and/or the second web service system 204 via the user device 208. For example, the first web service system 202 and/or the second web service system 204 may include, without limitation, a social network service system (e.g., Facebook™, VK™), an email service system (e.g., Gmail™, Yandex.Mail™), an account management service (e.g., Yandex.Passport™), an information keeping service (e.g., Evernote™), a blog web service system (e.g., Twitter™) or an e-commerce service system (e.g., Amazon™, Expedia™).

It should be understood that, in some exemplary embodiments, the first web service system 202 and the second web service system 204 may be both part of a common web service system offering at least two different web services. In this example, the first and second web service systems 202, 204 may be owned and/or operated by a same entity and/or offer two different web services both hosted under a common domain name (e.g., an email service system Yandex.Mail™ being a first web service and an account management service Yandex.Passport™ being a second web service, both services being hosted under a common domain name "Yandex").

On the contrary, in some other exemplary embodiments, the first web service system 202 and the second web service system 204 may be each part of distinct web service systems offering at least two different web services. In this example, the first and second web service systems 202, 204 may be owned and/or operated by different entities and/or offer two different web services hosted under different domain names (e.g., an email service system Yandex.Mail™ being a first web service and an e-commerce service system Amazon™ being a second web service, both services being hosted under the different domain names "Yandex" and "Amazon").

It should also be understood, that, in some other exemplary embodiments, the first and the second web service systems 202, 204 may each host one or more web services. For example, the first web service system 202 may host an email service system (Yandex.Mail™) and an account management service (e.g., Yandex.Passport™) while the second web service may host an information keeping service (e.g., Evernote™) and/or an e-commerce service system (e.g., Expedia™). It should also be understood, that, in some exemplary embodiments, the first web service system 202 may be referred to as a base web service system and the second web service system 204 may be referred to as a side web service system while, in some other exemplary embodiments, the first web service system 202 may be referred to as a side web service system and the second web service system 204 may be referred to as a base web service system.

The first and second web service systems 202, 204 may comprise one or more servers. Each server may comprise internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating via the network 206.

The user device 208 may interact with the first web service 202 and/or the second web service 208 by receiving input from the service user 170 and receiving and transmitting data via the network 206. The user device 208 may be, for example and without being limitative, a desktop computer, a laptop computer, a smart phone (e.g. an Apple iPhone™ or a Samsung Galaxy SS™), a personal digital assistant (PDA) or any other device including computing functionality and data communication capabilities. The user device 208 may comprise internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the first and second web services 202, 204 via the network 206.

In one embodiment, the user device 208 displays content from the first and/or second web service systems 202, 204 by processing a markup language document 214 received from the first and/or second web service systems 202, 204. The markup language document 214 identifies content and one or more instructions describing formatting or presentation of the content. By executing the instructions included in the markup language document 214, a browser application 210 displays the identified content using the format or presentation described by the markup language document 214. In various embodiments, the markup language document 214 comprises a data file including extensible markup language (XML) data, extensible hypertext markup language (XHTML) data or other markup language data.

In other embodiments, the user device 208 may also include a cookie 212 that contains data indicating whether the service user 170 of the user device 208 is logged into the first web service system 202. The cookie 212 may indicate whether the service user 170 is involved in an active session where the user device 208 exchanges data with the first web service system 202, providing that the service user 170 has an account associated with the first web service system 202.

Figure 3:
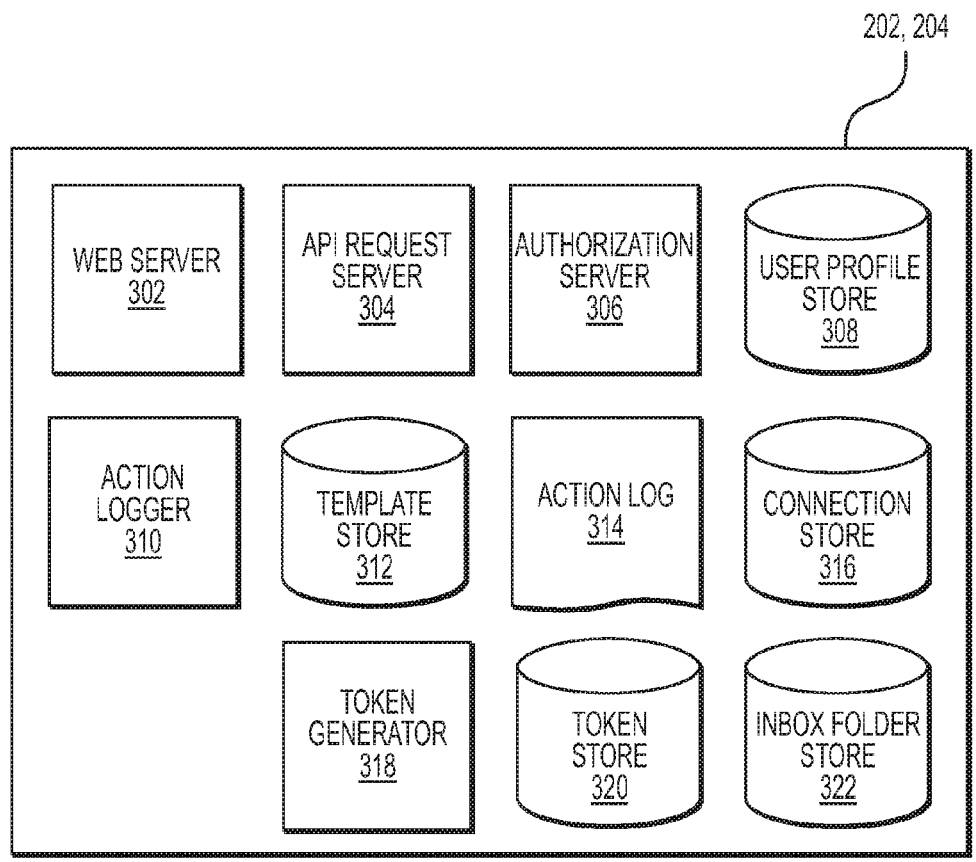
FIG. 3 is a diagram of a web service system suitable for use with some implementations of the present technology.

FIG. 3 is a diagram of a web service system suitable for use with some implementations of the present technology. The diagram of FIG. 3 illustrates exemplary embodiments of the first web service system 202 and/or the second web service system 204. For the purpose of easing description of the exemplary embodiments reference is made to the first and second web service systems 202, 204 but it should not be inferred that the first and second web service systems 202, 204 have to be similar to be suitable for use with some implementations of the present technology. The first web service system 202 and the second web service system 204 may be dissimilar and/or may each deviate (partially or totally) from the web service system illustrated at FIG. 3 without departing from the scope of the present technology.

The first and second web service systems 202, 204 may comprise a web server 302, an Application Programming Interface (API) request server 304, an authorization server 306, a user profile store 308, an action logger 310, a template store 312, an action log 314, a connection store 316, a token generator 318, a token store 320 and/or an inbox folder store 322. In other embodiments, the first and second web service systems 202, 204 may include additional, fewer, or different modules for various applications. Conventional components such as network interfaces, security mechanisms, load balancers, failover servers, management and network operations consoles, and the like are not shown so as to not obscure the details of the system.

The web server 302 of the first web service system 202 may link the first web service system 202 to one or more user device and/or one or more external websites such as the user device 208 and/or the second web service system 204 via the network 206. The web server 302 serves web pages, as well as other web-related content, such as Java, Flash, XML, and so forth. The web server 302 may include a mail server or other messaging functionality for receiving and routing messages between the first web service system 202 and one or more user devices 208. The messages can be instant messages, queued messages (e.g., email), text and SMS messages, or any other suitable messaging format.

The API request server 304 of the first web service system 202 allows one or more external web service systems such as the second web service system 204 to exchange information with the first web service 202 by calling one or more APIs. Such exchange of information may be a sending of information from the first web service system 202 to the second web service system 204 and/or a sending of information from the second web service system 204 to the first web service system 202. Such exchange of information may be, for example but without being limitative, an authentication request, a token used to anonymously identify a service user 170 and/or data associated with an action performed on the second web service system 204 as detailed in the paragraphs set forth below. The API request server 304 of the first web service system 202 may also allow the second web service system 204 to send information by calling APIs. For example, the second web service system 204 sends an API request to the first web service system 202 via the network 206 and the API request server 304 receives the API request. The API request server 304 processes the request by calling an API associated with the API request to generate an appropriate response, which the API request server 304 communicates to the second web service system 204 via the network 206.

The authorization server 306 of the first web service system 202 may contain logic to determine if certain information associated with a user can be accessed by a user's friends, external websites such as the second web service system 204 and/or other applications and entities. The authorization server 306 may enforce one or more privacy settings of the users of the first web service system 202. A privacy setting of a user determines how particular information associated with a user can be shared. The privacy setting comprises the specification of particular information associated with a user and the specification of the entity or entities with whom the information can be shared. Examples of entities with which information can be shared may include other users, applications, the second web service system 204 or any entity that can potentially access the information. The information that can be shared by a user may comprise user profile information like profile photo, phone numbers associated with the user, user's connections, actions taken by the user such as adding a connection, changing user profile information and the like.

In some embodiments, the authorization server 306 of the first web service system 202 may manage one or more lists of actions that the second web service system 204 may be authorized to perform on the first web service system 202. In some embodiments, the one or more lists of actions may be stored in the user profile store 308, the connection store 316, the token store 320 and/or the inbox folder store 322. Other data storage locations may also be equally used without departing from the scope of the present technology.

A list of actions may be associated with an account of a user of the first web service system 202 and may be generated further to the user being prompted to establish a list of actions she/he wishes to authorize the second web service system 204 to perform. For example, such actions may include conducting a transaction (e.g., a financial transaction for cases where the second web service system 204 is an e-commerce service system), sending data generated further to a conduct of a transaction (e.g., sending a confirmation receipt further to a buying of a plane ticket for cases where the second web service system 204 is a travel agency web service system), sending data generated further to an interaction of a user with the second web service system 204, etc.

In alternative embodiments, the authorization server 306 of the second web service system 204 may contain logic to determine if an action can be performed for the service user based on certain parameters, such as a token received from the first web service system 202. As set forth above in connection with the authorization server 306 of the first web service system 202, the action may include conducting a transaction (e.g., a financial transaction for cases where the second web service system 204 is an e-commerce service system), sending data generated further to a conduct of a transaction (e.g., sending a confirmation receipt further to a buying of a plane ticket for cases where the second web service system 204 is a travel agency web service system), sending data generated further to an interaction of a user with the second web service system 204, etc.

The action logger 310 may be capable of receiving communications from the web server 302 about user actions on and/or off the first web service system 202 and/or the second web service system 204. The action logger 310 may populate the action log 314 with information about user actions, allowing the first web service system 202 to track various actions taken by its users within the first web service 202 and/or outside of the first web service 202 such as within the second web service 204. Any action that a particular user takes may be associated with each user's profile, through information maintained in the action log 314 or in a similar database or other data repository.

Examples of actions taken by a user within the first web service system 202 that are identified and stored may include, for example, adding a connection to another user, sending a message to another user, reading a message from another user, viewing content associated with another user, attending an event posted by another user or other actions interacting with another user. When a user takes an action within the first web service system 202, the action is recorded in the action log 314. In one embodiment, the first web service system 202 maintains the action log 314 as a database of entries. When an action is taken within the first web service system 202, an entry for the action is added to the action log 314.

Additionally, user actions may be associated with an entity outside of the first web service system 202, such as the second web service system 204 that is separate from the first web service system 202. For example, the action logger 310 receives data describing a user's interaction with the second web service system 204 received from the web server 302. Examples of actions where a user interacts with the second web service system 204, or an object associated therewith, include a user expressing an interest in an external website or another entity, a user posting a comment within the second web service system 204, a user posting to the first web service system 202 a Uniform Resource Locator (URL) or other identifier associated with the second web service system 204, a user attending an event associated with the second web service system 204, a user conducting a transaction on the second web service system 204, or any other action by a user that is related to the second web service system 204 or an object associated therewith. Thus, the action log 314 may include actions describing interactions between the first web service system 202 and the second web service system 204 that is separate from the first web service system 202.

The token generator 318 may be capable of generating a token anonymously authenticating a service user of the first web service system 202. In some embodiments, the token may be an indication allowing to uniquely identify the service user of the first web service system 202 without disclosing any of the information associated with the account of the user. In some alternative embodiments, the token may be an indication allowing to uniquely identify the service user of the first web service system 202 while disclosing some, but not all, of the information associated with the account of the user. In yet other alternative embodiments, the token may be an indication allowing to uniquely identify a group of one or more service users of the first web service system 202 without disclosing any, or, alternatively, while disclosing some, but not all, of the information associated with the accounts of the users of the group of one or more service users. The token may be generated based on data relating to an account of the service user 170, such as, for example, data stored in the user profile store 308, the connection store 316 and/or the token store 320. In some embodiments, the token may comprise first data anonymously authenticating the service user 170 and second data identifying an action that the second web service system 204 is authorized to perform for the service user 170. In some embodiments, a token generated by the first web service system 202 may be stored in the token store 320 of the first web service system 202 and/or the token store 320 of the second web service system 204.

Additionally, the first web service system 202 maintains data about objects with which a user may interact with using the first web service system 202. To maintain this data, the user profile store 308 and the connection store 316 store instances of the corresponding type of objects maintained by the first web service system 202. Each object type has information fields that are suitable for storing information appropriate to the type of object. For example, the user profile store 308 contains data structures with fields suitable for describing a user's profile. When a new object of a particular type is created, the first web service system 202 initializes a new data structure of the corresponding type, assigns a unique object identifier to it, and begins to add data to the object as needed. This might occur, for example, when a user becomes a user of the first web service system 202, the first web service system 202 generates a new instance of a user profile in the user profile store 308, assigns a unique identifier to the user profile, a password associated with the unique identifier, and begins to populate the fields of the user profile with information provided by the user.

As described in connection with FIG. 2, for instances where the service user 170 has an account associated with the first web service system 202 and/or the second web service system 204, the account associated with the first web service system 202 and/or the second web service system 204 may comprise personal information about the service user 170 such as, without being limitative, user's name, user's address, user's financial information (e.g., bank account information, credit card information, etc.).

In other embodiments, the account may not comprise personal information per se but rather one or more links to personal information. Yet in other embodiments, the account may comprise other information, such as, in the example of a social network web service, a social network or a social graph identifying other users or entities with which the service user 170 maintain relationships. In some embodiments, the personal information and the other information may be stored in the user profile store 308. Other locations for storing the personal information and the other information may be used without departing from the scope of the present technology.

In an embodiment, the service user 170 may access to the account associated with the first web service system 202 by providing, for example but without being limitative, a login and/or password uniquely identifying the service user 170 with the first web service system 202. It should be understood that other means of uniquely identifying the service user 170 with the first web service system 202 may be used without departing from the scope of the present technology. Such other means may include, for example, biometric information such as fingerprint, iris and/or facial recognitions.

In one embodiment, an object type may be used to identify a template from the template store 312 used to display content received, for example, from a web page from a second web service system 204. For example, a template may be used to display content from a web page associated with an object that is a confirmation receipt generated further to a transaction conducted by the service user 170 on the second web service 204 (e.g., a receipt confirming the buying of a plane ticket).

The connection store 316 includes data structures suitable for describing a user's connections to other users, connections to the second web service system 204, or connections to other entities. The connection store 316 may also associate a connection type with user's connections, which may be used in conjunction with the user's privacy setting, further described above, to regulate access to information about the user. Data stored in the connection store 316, the user profile store 308 and the action log 314 allows the first web service system 202 to identify relationships between different objects.

The inbox folder store 322 may include data structures suitable for storing data received from the second web service system 204 as a result of an action undertaken by the second web service system 204. Examples of data received from the second web service system 204 may include data associated with the conduct of a transaction (e.g., a financial transaction for cases where the second web service system 204 is an e-commerce service system). As it could be appreciated by a person skilled in the art of the present technology, the inbox folder store 322 may provide a centralized repository of data received from web service systems external to the first web service system 202 such as the second web service system 204.

The inbox folder store 322, in combination with the method of anonymously identifying a service user set forth in the paragraphs below, allows to provide an "all-eggs-in-one basket solution" centralizing the storage of data generated by web service systems external to the first web system 202 without requiring a user to share some or all of her/his personal information or account information with the external web service systems. The inbox folder store 322 is an exemplary embodiment of the present technology but it should be appreciated that data received from the second web service system 204 as a result of an action undertaken by the second web service system 204 may be stored in various repositories, such as, but not limited to, the user profile store 308, the connection store 316 and/or the token store 322 without departing from the scope of the present technology.

Figure 4:
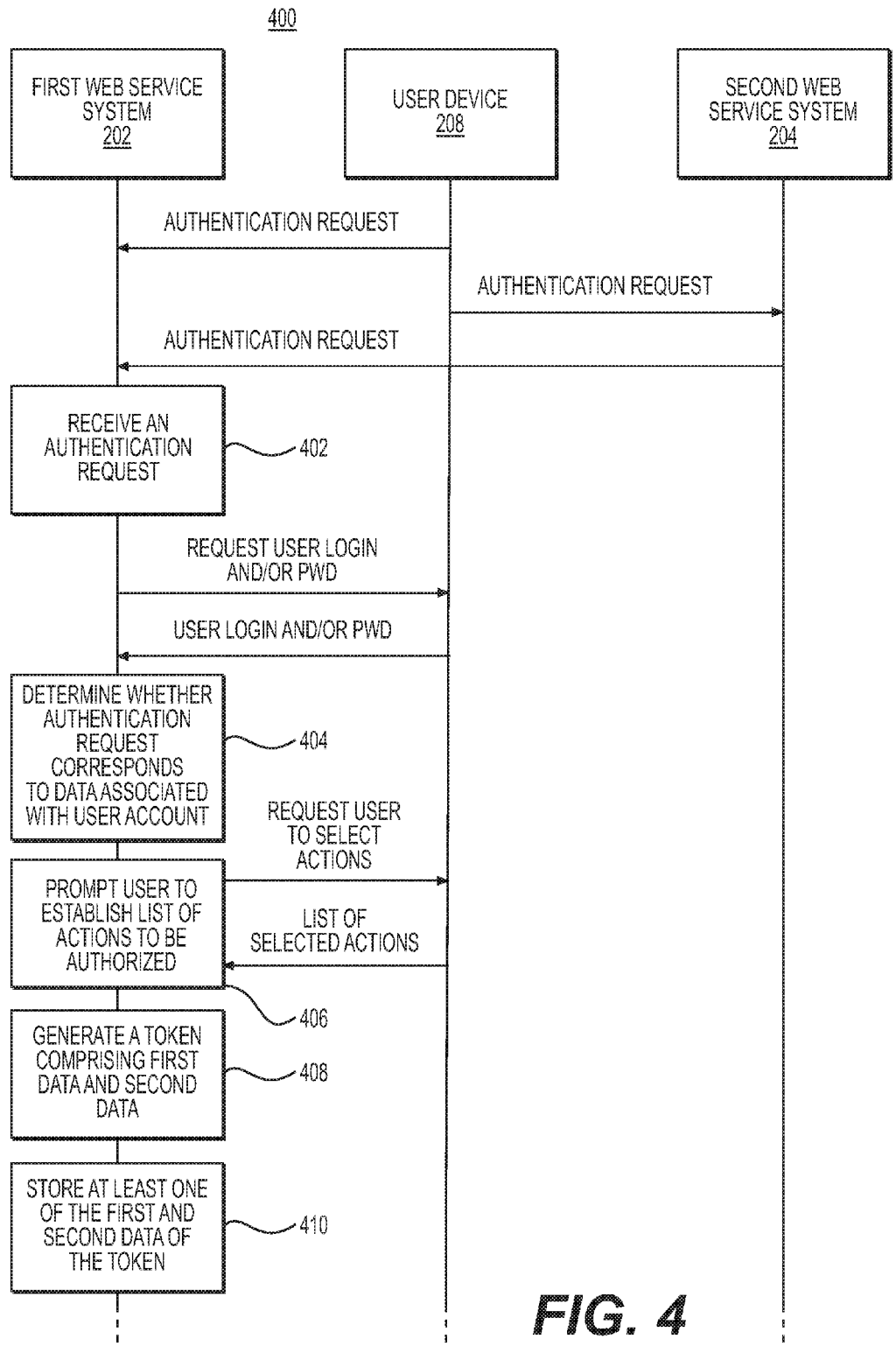
FIGS. 4 to 6 are interaction diagrams of a computer-implemented method of anonymously authenticating a service user for execution on a first web service system and/or a second web service system, in accordance with an embodiment of the present technology.
Figure 5:
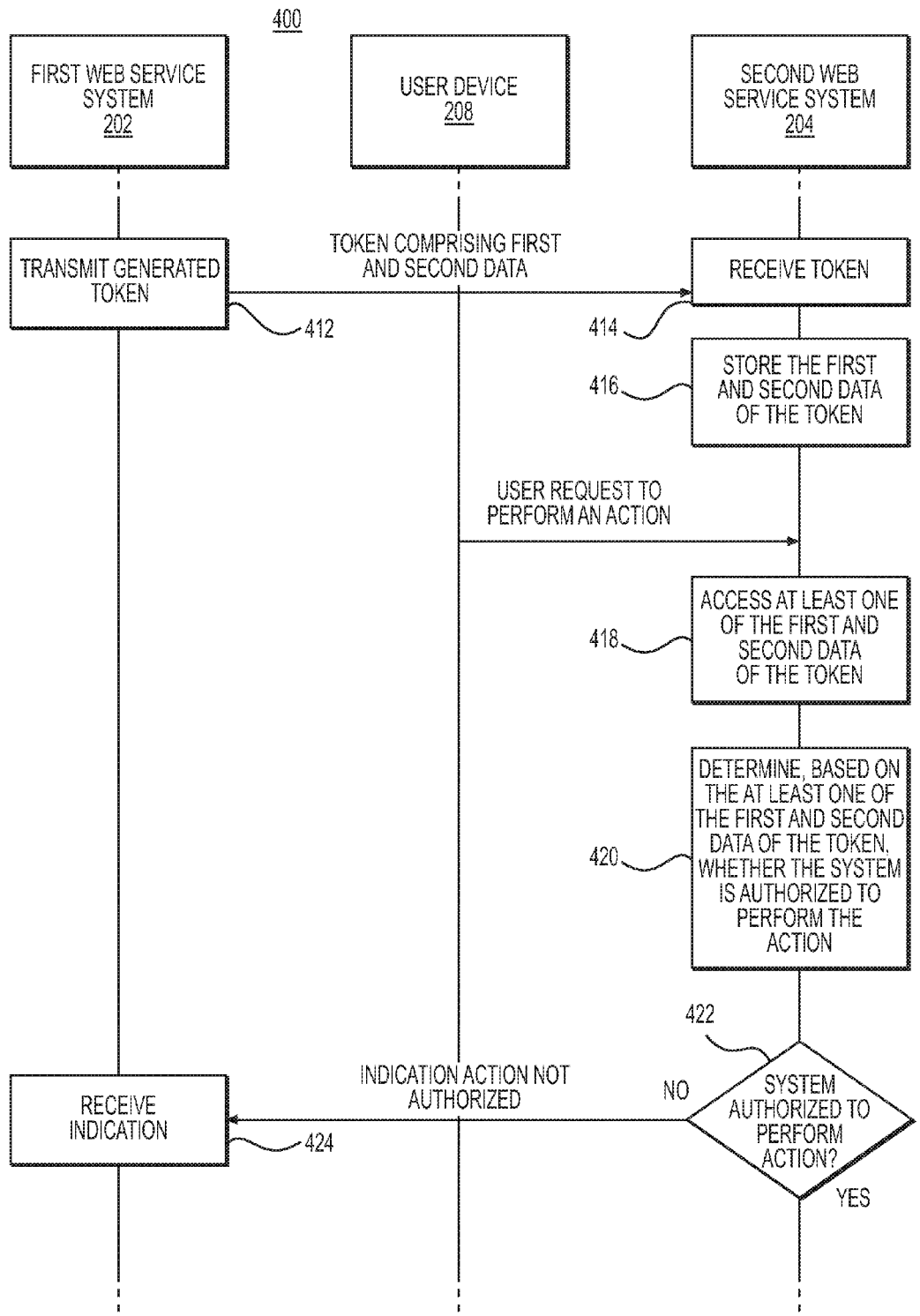
Figure 6:
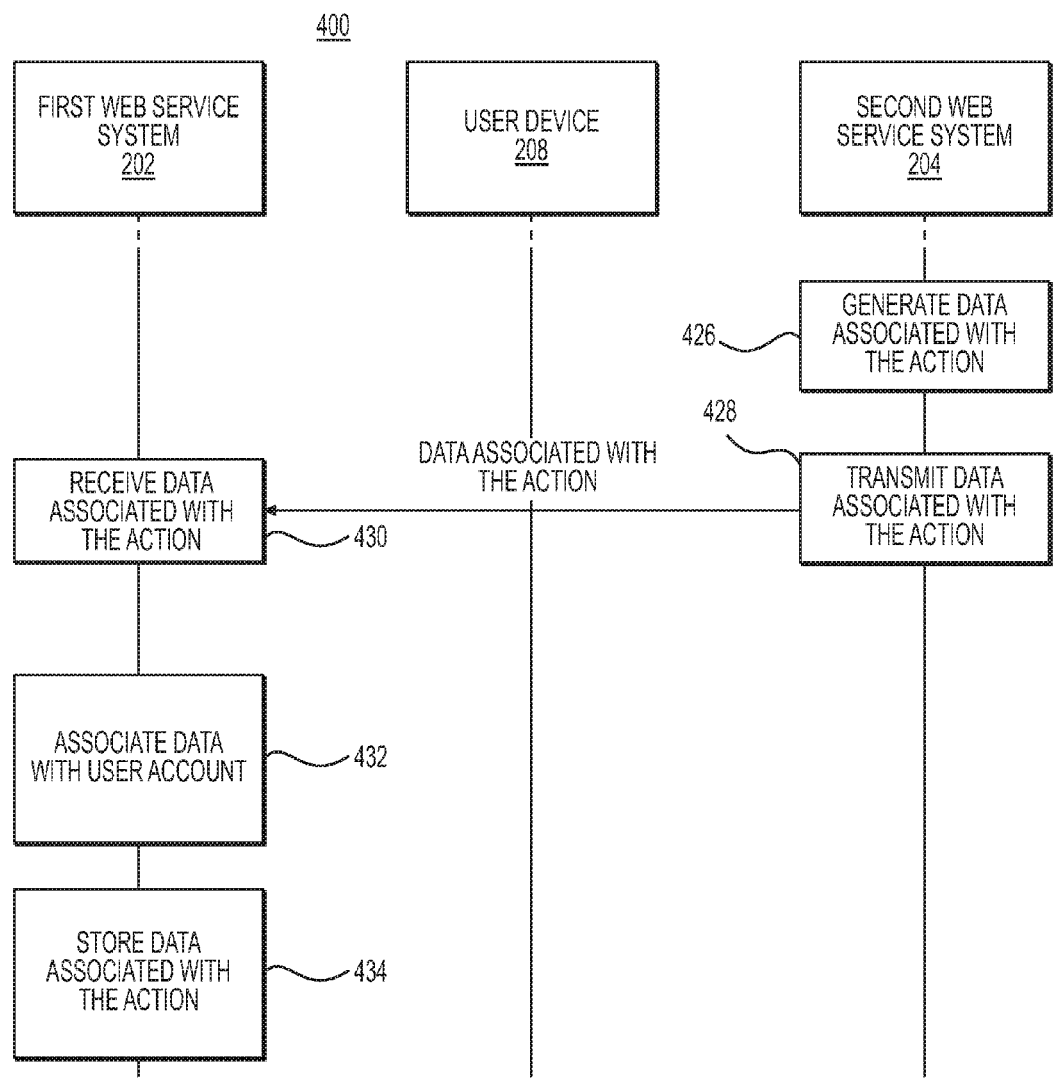

Having described, with reference to FIG. 1 to FIG. 3, some non-limiting example instances of the first and second web service systems 202, 204 for use in connection with the problem of anonymously authenticating a service user associated with the first web service system 202, we shall now describe a general solution to this problem with reference to FIG. 4 to FIG. 6.

More specifically, FIG. 4 to FIG. 6 show interaction diagrams of computer-implemented method of anonymously authenticating a service user for execution on a first web service system 202 and/or a second web service system 204, in accordance with an embodiment of the present technology. The computer-implemented method 400 may comprise a first computer-implemented method executable by a processor of the first web service system 202, the method comprising a first series of steps to be carried out by the first web service system 202. The computer-implemented method 400 may also comprise a second computer-implemented method executable by a processor of the second web service system 204, the method comprising a second series of steps, the second series of steps may be different from the first series of steps, to be carried out by the second web service system 204.

The computer-implemented method 400 may be carried out, for example, in the context of the first web service system 202 and/or the second web service system 204 of FIG. 2 and FIG. 3 by processors 110 executing program instructions having been loaded into random access memories 130 from solid-state drives 120 of the first web service system 202 and/or of the second web service system 204.

At step 402, the first web service system 202 may receive an authentication request, the authentication request may originate from the user device 208 of the service user 170. The service user 170 may have an account associated with the first web service system 202. The authentication request may comprise data identifying the account of the service user 170 associated with the first web service system 202. In an embodiment, the authentication request may be received from the user device 208. Alternatively, the authentication request may be received by the second web service system 204 from the user device 208. In turn, the second web service system 204 may transmit the authentication request to the first web service system 202. Once the authentication request is received by the first web service system 202, the first web service system 202 may request the service user 170 to provide authentication information, such as, for example, a user login and/or a user password.

At step 404, the first web service system 202 may determine whether the authentication request corresponds to data associated with the account of the service user 170 associated with the first web service system 202, for example, based on authentication information provided by the service user 170.

At step 406, the first web service system 202 may prompt the service user 170 to establish a list of actions that the second web service 204 is authorized to perform. The service user 170 may create the list of actions by receiving, on the user device 208, a request inviting the service user 170 to select actions that the second web service 204 may be authorized to perform. Once the actions are selected by the service user 170, the user device 208 may transmit the list of actions to the first web service system 202. The list of actions may be associated with the user profile of the service user 170 and may be stored in a memory of the first web service system 202.

At step 408, the first web service system 202 may generate a token anonymously identifying the service user 170. In an embodiment, the token may be generated by the token generator 318 of the first web service system 202. The token may allow the second web service system 204 to perform an action associated with the service user 170 without accessing data relating to personal information relating to the service user 170. The data relating to personal information relating to the service user 170 may be stored in a memory of the first web service system 202 which access thereto by the second web service system 204 may be precluded. In an embodiment, the memory in which the data relating to personal information may be stored may be the user profile store 308 of the first web service system 202. As such, the token may allow the second web service system 204 to perform an action associated with the service user 170 while preventing the second web service system 204 to identify the service user 170 and/or access personal information relating to the service user 170. The token may be generated based on data relating to the account of the service user associated with the first web service system 202. The token may comprise first data anonymously authenticating the service user 170 and/or second data identifying an action that the second web service system 204 may be authorized to perform for the service user 170. The second data of the token may be generated, at least partially, based on the list of actions that the second web service system 204 is authorized to perform for the service user 170. In some examples, the list of actions may be the one generated at step 406, a list of actions generated by other means or a list previously stored in a memory of the first web service system 202.

At step 410, the first web service system 202 may store, in a memory of the first web service 202, such as the token store 320, the first data of the token and/or the second data of the token.

Then, at step 412 (FIG. 5), the first web service 202 may transmit the token to the second web service 204. In some examples, the token may be transmitted to the user device 208 which may store the token and/or transmit it to the second web service system 204.

In some examples, the token may be formed as a first data package and a second data package. The first data package may comprise the first data of the token and the second data package may comprise the second data of the token. The first data package and the second data package may be generated and transmitted by the first web service system 202 independently from one another. In other examples, the token may be formed as a single data package.

Turning now to the second web service system 204, the token generated by the first web service system 202 is received by the second web service system 204 at step 414.

Then, at step 416, the first data and/or the second data of the token is stored in a memory of the second web service 204.

At step 418, the second web service system 204 may access the first data and/or the second data of the token by accessing the memory of the second web service system 204. In an embodiment, the memory from which the first data and/or the second data of the token may be accessed may be the token store 320 of the second web service system 204. In some examples, the step 418 may be carried out by the second web service system 204 as a result of a request received from the user device 208.

At steps 420 and 422, the second web service system 204 may determine, based on the first data and/or the second data of the token accessed at step 418, whether the second web service system 204 is authorized to perform the action for the service user 170. In some examples, determining whether the second web service system 204 is authorized to perform the action for the service user 170 may comprise granting an authorization to perform the action by the second web service system 204 if the action which the second web service system 204 is attempting to perform corresponds to the action identified by the second data of the token. In some other examples, determining whether the second web service system 204 is authorized to perform the action for the service user 170 may comprise declining an authorization to perform the action by the second web service system 204 if the action which the second web service system 204 is attempting to perform does not correspond to the action identified by the second data of the token.

In yet some other examples, if the second web service system 204 determines, at step 422, that the second web service system 204 is not authorized to perform the action, the second web service system 204 proceeds by sending, to the first web service system 202, an indication that the action is not authorized to be performed by the second web service 204. At step 424, the indication is received by the first web service system 202 which may store the indication in the memory of the first web service system 202. In some other examples, if the second web service system 204 determines at, step 422, that the second web service system 204 is authorized to perform the action, then the second web service system 204 proceeds to step 426.

At step 426 (FIG. 6), the second web service system 204 may generate data associated with the action performed by the second web service system 204. In some examples, the data may include data generated further to the conducting of a transaction on the second web service system 204 (e.g., a confirmation receipt generated further to a buying of a plane ticket for the service user 170 for cases where the second web service system 204 is a travel agency web service system). As it would be appreciated by a person skilled in the art of the present technology, numerous variations of data associated with the action and/or variations of actions may be envisioned without departing from the scope of the present technology. In some examples, the data associated with the action performed by the second web service system 204 may be stored in the memory of the second web service system 204.

At step 428, the data generated at step 426 may be transmitted to the first web service system 202. In other examples, the data generated at step 426 may be transmitted to the user device 208.

At step 430, the first web service system 202 may receive, from the second web service system 204, the data generated at step 426. Then, at step 432, the first web service system 202 may associate the data with the account of the service user 170 associated with the first web service system 202. In some examples, upon receiving the data at step 430, but before carrying out step 432, the first web service system 202 may identify the first data of the token associated with the received data. Then, the first web service system 202 may read, from the memory of the first web service system 202, the second data of the token corresponding to the first data of the token identified as being associated with the data associated with the action performed by the second web service system 204.

Then, the first web service system 202 may determine whether the action performed by the second web service system 204 corresponds to the action identified in the second data of the token read from the memory of the first web service system 202. In yet some examples, the data may be stored, at step 434, in the memory of the first web service system 202, such as, for example, the inbox folder store 322 of the first web service system 202.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of anonymously authenticating a service user having an account associated with a first web service system, the method executable by a processor of a second web service system, the second web service system being different from the first web service system, the method comprising:
   receiving a token generated by the first web service system in response to an authentication request originating from an electronic device of the service user, the token comprising first data anonymously authenticating the service user while preventing the second web service system from identifying information associated with the account of the service user and second data identifying an action that the second web service system is authorized to perform for the service user;
   storing, in a non-transitory computer-readable medium of the second web service system, the first and second data of the token;
   accessing at least one of the first and second data of the token in response to an attempt of the second web service system to perform an action associated with the service user;
   determining, based on the at least one of the first and second data of the token, whether the second web service system is authorized to perform the action for the service user; and
   responsive to the determining rendering a positive determination, authorizing by the second web service system the service user to access the second web service system, the authorizing being done without the second web service system being able to identify information associated with the account of the service user; the authorizing including allowing the service user to perform the action.

2. The method of claim 1, wherein upon determining that the second web service system is authorized to perform the action for the service user, the method further comprises generating data associated with the action performed by the second web service system.

3. The method of claim 2, further comprising transmitting, to one of the first web service system and the electronic device, the data associated with the action performed by the second web service system.

4. The method of claim 1, wherein, upon determining that the second web service system is not authorized to perform the action for the service user, the method further comprises:
   transmitting, from the second web service system to the first web service system, an indication that the action for the service user is not authorized.

5. The method claim 1, wherein receiving the token generated by the first web service system in response to an authentication request originating from an electronic device of the service user is executed after:
   receiving, on the second web service system, the authentication request from the electronic device of the service user, the authentication request comprising data identifying the account of the service user associated with the first web service system; and
   transmitting, from the second web service system, the authentication request to the first web service system.

6. The method of claim 1, wherein the token is formed as a first data package and a second data package, the first data package comprises the first data of the token and the second data package comprises the second data of the token, the first and second data packages being generated and transmitted independently from one another.

7. The method of claim 1, wherein the first web service system has a different domain name than the second web service system.

8. The method of claim 1, wherein the first web service system is one of a social network service system, an email service system, an account management service system, an information keeping service, a blog web service system and an e-commerce service system; and wherein the second web service system is one of a social network service system, an email service system, an account management service system, an information keeping service, a blog web service system and an e-commerce service system.

9. The method of claim 1, wherein the method further comprises:
   responsive to the determining rendering a negative determination, not authorizing by the second web service system the service user to access the second web service system to perform any actions, the not authorizing being done without the second web service system being able to identify information associated with the account of the service user.

10. A computer-implemented method of anonymously authenticating a service user having an account associated with a first web service system, the method executable by a processor of the first web service system, the method comprising:
- receiving an authentication request originating from an electronic device of the service user, the authentication request comprising data identifying the account of the service user associated with the first web service system;
- generating, based on data relating to the account of the service user associated with the first web service system, a token comprising first data anonymously authenticating the service user while preventing a second web service system from identifying information associated with the account of the service user and second data identifying an action that the second web service system is authorized to perform for the service user, the second web service system being different from the first web service system;
- storing, in a non-transitory computer-readable medium of the first web service system, at least one of the first and second data of the token;
- transmitting the generated token to the second web service system;
- determining by the second web service system, based on the at least one of the first and second data of the token, whether the second web service system is authorized to perform the action for the service user; and
- responsive to the determining rendering a positive determination, authorizing by the second web service system the service user to access the second web service system, the authorizing being done without the second web service system being able to identify information associated with the account of the service user; the authorizing including allowing the service user to perform the action.

11. The method of claim 10, further comprising receiving, from the second web service system, data associated with an action performed by the second web service system for the service user, the action performed by the second web service corresponding to the action identified by the second data of the token.

12. The method of claim 11, wherein the data associated with the action performed by the second web service is generated further to a determination made by the second web service system, based on the second data of the token, that the second web service system is authorized to perform the action for the service user.

13. The method of claim 11, wherein the second data of the token are being generated, at least partially, based on a list of actions that the second web service system is authorized to perform for the service user.

14. The method of claim 13, wherein receiving the authentication request originating from the electronic device of the service user is executed after:
- prompting the service user to establish the list of actions that the second web service is authorized to perform.

15. The method of claim 11, wherein receiving the authentication request originating from the electronic device of the service user is executed before:
- determining whether the authentication request corresponds to data associated with the account of the service user associated with the first web service system.

16. The method of claim 11, further comprising:
- associating the data associated with the action performed by the second web service system with the account of the service user associated with the first web service system; and
- storing, in the non-transitory computer-readable medium of the first web service system, the data associated with the action performed by the second web service system.

17. The method of claim 11, further comprising:
- identifying the first data of the token associated with the data associated with the action performed by the second web service system;
- reading, from the non-transitory computer-readable medium of the first web service system, the second data of the token corresponding to the first data of the token identified as being associated with the data associated with the action performed by the second web service system; and
- determining whether the action performed by the second web service system corresponds to the action identified in the second data of the token read from the non-transitory computer-readable of the first web service system.

18. The method of claim 17, further comprising, upon determination that the action performed by the second web service system corresponds to the action identified in the second data of the token read from the non-transitory computer-readable of the first web service system:
- associating the data associated with the action performed by the second web service system with the account of the service user associated with the first web service system; and
- storing, in the non-transitory computer-readable medium of the first web service system, the data associated with the action performed by the second web service system.

19. The method of claim 10, further comprising receiving from the second web service system, an indication that the action for the service user is not authorized, the indication being generated by the second web service system upon determining that the second web service system is not authorized to perform the action for the service user.

20. The method of claim 10, wherein the method further comprises:
- responsive to the determining rendering a negative determination, not authorizing by the second web service system the service user to access the second web service system to perform any actions, the not authorizing being done without the second web service system being able to identify information associated with the account of the service user.

* * * * *